United States Patent [19]

Girden

[11] 4,355,513

[45] Oct. 26, 1982

[54] METHOD AND APPARATUS FOR PRODUCING ELECTRICITY FROM THERMAL SEA POWER

[76] Inventor: Barney B. Girden, 1281 NW. 43rd Ave., Lauderhill, Fla. 33313

[21] Appl. No.: 127,642

[22] Filed: Mar. 6, 1980

[51] Int. Cl.³ .............................................. E03G 7/04
[52] U.S. Cl. .................................. 60/641.7; 60/398; 417/108
[58] Field of Search ...................... 60/641, 398, 641.7; 417/108

[56] References Cited

U.S. PATENT DOCUMENTS

| | | | |
|---|---|---|---|
| 1,508,788 | 9/1924 | Halvorsen | 417/108 |
| 2,744,065 | 5/1956 | Lacey | 417/108 X |
| 3,028,817 | 4/1962 | Cunetta | 417/108 |
| 3,542,490 | 11/1970 | Gare | 417/108 |
| 3,683,627 | 8/1972 | Girden | 405/52 |
| 4,030,301 | 6/1977 | Anderson | 60/641.7 |
| 4,159,427 | 6/1979 | Wiedemann | 60/698 X |
| 4,245,475 | 1/1981 | Girden | 60/641 |

*Primary Examiner*—Allen M. Ostrager
*Attorney, Agent, or Firm*—Richard M. Saccocio

[57] ABSTRACT

A method and apparatus of producing useful energy from a large body of water having cold subsurface water and water at the surface which is warmer than the subsurface water. The apparatus comprises a tubular pump to air-lift in a manner to be described cold subsurface water to the surface and which tube is open at the surface and open at the colder subsurface water and wherein a vertically adjustable air jet assembly is arranged within the tube and connected to a compressed air source to release bubbles from the air jet assembly which rise within the tube, entraining cold subsurface water, making it buoyant and cooling the surface. The method of producing useful energy includes the steps of creating an area on the warm surface of a large body of water which is colder than normal by utilizing compressed air to upwell the cold subsurface water by releasing compressed air through an air jet assembly which is vertically adjustable in a vertical conduit having an opening at the lower end and also at the upper end and which is of a length to extend to a depth within the large body of water at which cold subsurface water is located so that, when compressed air is released through the air jet assembly, it rises in the tube from a level which is most efficient entraining water and causing cold subsurface water to rise to the surface and utilizing the temperature gradient between the cooled surface of the water and the normally warmer surface of the water to generate electricity.

10 Claims, 7 Drawing Figures

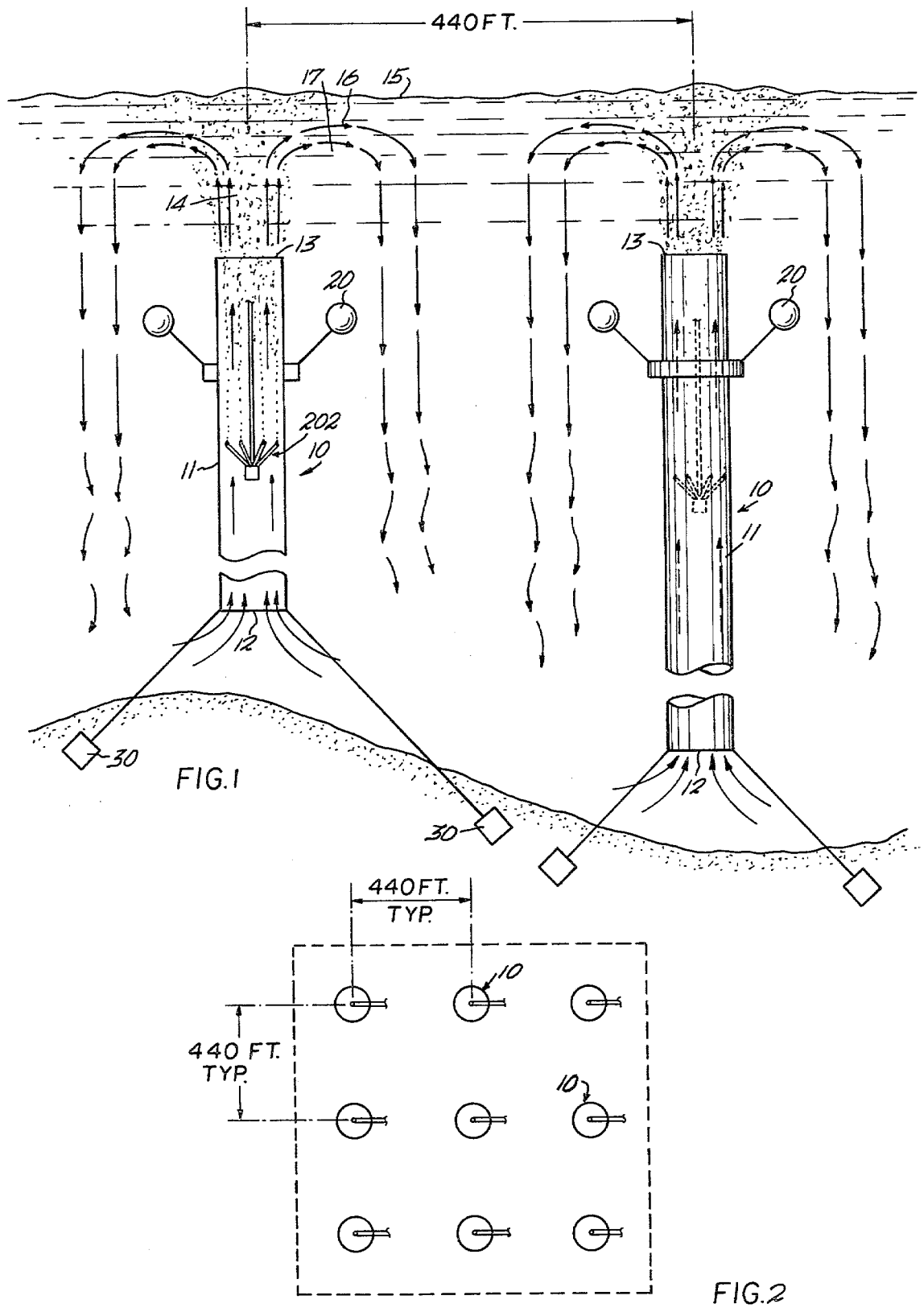

METHOD AND APPARATUS FOR PRODUCING ELECTRICITY FROM THERMAL SEA POWER

BACKGROUND OF THE INVENTION

A difference in temperature of one to five degrees between the surface water and that of the neighboring land or warm surrounding water causes winds to blow.

Our coolant water subsurface water of 40° upwelled to the surface as described herein compared to the temperature of the neighboring land or the warm surrounding waters has a difference of as much as 20°, 30°,40° or more degrees. This temperature gradient permits up to use wind-turbines and heat engines as described below to work efficiently.

To do this we make cold deep subsurface water buoyant and float it to the surface. Bubbling air into the water is an effective and efficient way to do this.

The mixture of enough bubbles under pressure, the buoyancy of air in water and the fact that water in water weighs only one ounce per cubic foot, causes enough buoyancy to drive the mixture of air and cold water to the water surface.

The flow pattern consists of a vertical jet rising from the submerged air source, through an air jet assembly, and a thin jet stream along the ocean surface.

The momentum of the vertical jet increases with the distance from the source. Thus applications using air bubblers are more efficient at deep submergence.

Much less air is required in deep water installation than in the shallow one. Most of this effect is laid to the increase in eddy velocity.

The ratio of water discharge to air discharge increases with depth and decreases with increasing air discharge.

We are surfacing our Coolant (water at 40°) from a depth of 700 feet or more. At this depth the water has a pressure of about 450 or more pounds per square inch. As the bubbles rise the water pressure lessens and the bubbles become larger. We want to control this bubble enlargement and have designed our Air Lift Pumps to do this.

In our nine duct per quarter square mile area, each duct must have enough diameter to carry 50,000 cubic feet per minute. Enough air must be mixed with this 50,000 cubic feet per minute to give this current its proper buoyancy and eddy velocity. The deeper the Coolant (40° water) the greater the eddy velocity.

By limiting the depth of the air jet assembly we can mix enough bubbles with the ascending current to give the mixture the necessary buoyancy to float on the ocean's surface and prevent too great an enlargement of the bubbles.

When a tidal basin is to be used to retain the 40° Coolant, U.S. Pat. Nos. 3,298,417 and 3, 632,508 are used.

What I propose is to create mechanically what is accomplished by nature by the upwelling waters of the California current that chill the breeze which is then drawn to the Golden Gate by the heat of the interior California area during the summer. This gives San Francisco its cool summers.

All over the world wherever land is adjacent to sizeable bodies of water, lakes as well as oceans, when there is a temperature difference between the land and the water, winds start from the colder denser atmosphere, blowing towards the warmer, lighter atmosphere. Depending on the degree of difference, the winds of the land water borders can develop from breezes to gales. These winds can penetrate inland a considerable distance, for example, the sea breeze that reaches Rome and the lake breeze that penetrates the whole Chicago area.

It is important to remember that the necessary factor in starting the wind is the temperature difference. A cold front is cold only by comparison. The critical factor is to develop a process that will upwell and maintain at the surface sufficient cold water to create the desired temperature differences.

The coast of the Pacific with its underwater canyons and the deep off shore waters and the Atlantic with its drowned river valleys along the entire shore permits both coasts to have an almost unlimited number of sites for wind machines.

A temperature difference of 15° or more between the "Coolant" water surface and the land or between the "Coolant" water surface and the surrounding warmer ocean surface causes wind of the desired speed to drive the propellers of wind-turbines for an efficient production of electricity. The temperature differences cause the wind speed, the greater the difference, the greater the speed. An excess production of electricity can be used to make hydrogen as an additional source of power.

A study of ten years of the climatological data (now discontinued) published daily by the United Sates government, furnishes a first hand knowledge of the wind speed caused by the temperature of the oceans against that of the land and between the temperature difference between the oceans' surface and the 40° Coolant Surface temperature. We attain the desired wind speed to suit the needs of the wind turbines.

The world's new source of energy should be turned into electricity, but as electricity is not readily storeable, it is expensive to transmit, it is not immediately useful in a vast majority of industrial and energy consuming equipment and cannot drive autos and planes. I have the newly generated electricity that is not used as electricity turned into the perfect fuel, hydrogen, that can replace all of the pollution forming fossil fuels. Hydrogen can also drive generators that can make electricity where needed.

One H.P. carries 2,000 cubic feet per minute, by means of the air lift pumps with the appratus and method described. One hundred thousand H.P. carries two hundred million cubic feet per minute. One square mile contains twenty-five million square feet. A hundred square miles contain two and a half billion square feet. This hundred square mile area is constantly bubbling.

All the two hundred million cubic feet are carried to the surface by bubbles. All the bubbles break through the water's surface tension and escape into the air.

The help of the "Air Bubbles" is not needed. The air cooled by the water becomes humidified and becomes an onshore wind to its warmer land or to the warmer surrounding waters.

200,000,000 cubic feed/minute of water has the capacity to cool or warm 600,000,000,000 cubic feet of air/minute.

In particular, in instant invention, the Girden air-lift pumps make the cold subsurface water (40° F.) lighter than the surface water by adding enough bubbles. The Girden air-lift pumps, by combining bubbles of air with water at depth, make the coolant lighter than the surrounding waters. In the form of a vertical jet stream, the coolant is carried to the surface where it turns into a thin, rapid, horizontal jet stream floating over the heavier, normal surface water, in circular symmetry. By the use of the Girden air-lift pumps one hundred thousand H.P., self-produced, can maintain a self-established one hundred square mile area of water with a surface temperature in the 40's. More or less area and horsepower can be used as desired.

The temperature difference between the coolant water surface and the surrounding warm water and warm land, causes a wind of the desired speed to drive the propellers of wind-turbines for an efficient production of electricity. The temperature difference causes the wind speed, the greater the difference, the greater the speed. An excess production of electricity can be used to make hydrogen as an additional source of power.

Wind control can make 'wind' one of the great producers of electricity before the gas and oil 'run out'. Now, for the first time, winds and their speeds can be under man's control.

A fair sized hurricane has the power of 500,000 atomic bombs of the type used on Nagasaki. It derives its energy from the accumlation of the heat of evaporation over vast areas of water. Since action and reaction are equal in opposite directions, for all the heat the vapor takes it leaves an equal amount of cold. This cold plus the cold of winter and from the submarine Arctic and Antarctic currents and the melting of ice is stored below the surface in the ocean and retained under a cover of warmer water. There is no convection to cause loss of the cold.

To give the amount of energy stored as cold in the subsurface waters of the ocean: it takes the power of a dozen Hoover Dams to blow a 9 mile per hour wind over the 2,500 square miles of the Los Angeles basin. Yet, all over the world a temperature dfference between land and the adjacent waters causes winds to blow over tens of thousands of miles of land and water.

My patents granted and pending make this energy available by using the fact that the specific heat of water is more than 3,000 times that of air, and when water is not raised above its surface level, each cubic foot weighs one ounce instead of sixty-two and a half pounds.

With the expenditure of 200,000 H.P. (self produced) enough energy can be obtained to do the work of 32 Hoover Dams.

There is a 'Compressor Unit' for each ¼ mile square unit either land based or floating. Each compressor gets its power from the wind-turbines or the heat engines. Each compressor unit has an individual tank for each nozzle. Each nozzle is an independent unit.

By using a 100 square mile area and using 100,000 H.P., the total lift is 200,000,000 cubic feet per minute. Each square mile uses 1,000 H.P. Each ¼ square mile area uses 250 H.P.

Using four (4) air-lift pumps for each ¼ square mile area—each pump is 660' from its neighbors. Each pump uses approximately 62.5 H.P. and raises 125,000 cubic feet per minute.

Using nine (9) air-lift pumps per ¼ square mile area, each pump is 440' apart. Each pump uses approximately 25 H.P. Each pump rises 50,000 cubic feet per minute.

Using sixteen (16) air-lift pumps for a ¼ square mile area, each pump is 330' apart. Each pump uses approximately 16 H.P., raising 32,000 cubic feet per minute.

Using twenty-five (25) air-lift pumps for each ¼ square mile area, each pump is 264' apart. Each pump uses approximately 10 H.P. and raises 20,000 cubic feet per minute.

In FIG. 2, an array of water pumps 10 is shown in a square area representative of the oceans' surface having sides ¼ mile long. A total of nine water pumps 10 are shown therein, each being spaced approximately 440 feet from each other. Each pump 10, in the outer row of the array is spaced 220 feet from the imaginary edge of the one-quarter square mile area. In this manner, any number of such arrays may be joined and each water pump 10 will be spaced 440 feet from an adjacent water pump 10.

We are 'bringing up' Coolant (water at 40°) from a depth of 700 to more than 1,000 feet—the water pressure is from 400–500 pounds per square inch.

As the bubbles arise the pressure decreases and the bubbles' size increases until the large bubbles decrease the efficiency of the Air Lift Pump.

The Air Jet Assembly has multiple air outlets— enough to furnish the bubbles with sufficient buoyancy to have the proper eddy velocity.

The size of the bubbles is determined by the distance of the Air Jet Assembly to the surface.

We permit the Air Jet Assembly to be lowered just enough so that the bubbles are properly enlarged.

When the buoyant mixture of air and water rises, the vacuum is eliminated by te ocean pressure forcing the coolant into the conduit.

When the Air Jet Assembly is in its proper position it is fixed. Much less pressure is needed than at the depth of the Coolant water.

When a tidal basin is to be used to retain the 40° F. Coolant U.S. Pat. Nos. 3,289,417 and 3,632,508 are used.

OBJECTS OF THE INVENTION

We use the Heat Engine to turn the oceans' temperature differences into electricity.

Seas with a surface water temperature of 70° or more can be used by the Heat Engine to generate electricity. Seventy degrees are enough to vaporize the heat pumps' secondary fluid contained in the boiler situated in the surface water. The condensor floating in the 45° Coolant water condenses the vapor, causing a vacuum.

The heat pumps turn this energy into electricity; the excess electricity can be used to form hydrogen that can be used as hydrogen in its liquid or gaseous state or easily converted into forms such as methanol, ammonia, and hydrazine. Fuel cells produce electricity from hydrogen at high efficiencies.

It is another object of this invention to provide a suitable method and apparatus for upwelling a sufficient volume of subsurface water so as to create a large continuous surface layer of cold water which floats on the surface of the tropical body of water.

Another object of this invention is to disclose a method and apparatus for converting sea thermal power into electrical energy by creating a large number of floating layers of cold water each of which is surrounded by warm tropical water and utilizing the temperature differential therebetween to provide heating and cooling of a fluid employed within a heat engine.

In another envisioned method, electrical power is produced by heat engines, the condensers which float on the cold 40° F. water and the boilers of which are under the surface of the periphery of each area cooled by air-lift pumps. Thus, the fluid in the system comprising the heat engine is heated to a gas in the boilers and condensed to a liquid in the condensers. Gas turbines placed therebetween are driven by the gaseous fluid and produce the electricity. By creating a large number of such areas which are spaced from each other by areas of warm water, vast unlimited amounts of electricity can thus be generated.

The pressure of the compressed air must, of course, be greater than the pressure existing at the working depth of the Air Jet Assembly. The Air Jet Assembly should have 0.4 of a H.P. more than the water pressure. If the working depth is 300 feet, the water pressure would be about 150 lbs./sq. inch, an extra 0.4 H.P. should be added.

The air bubbles admitted by the Air Jet Assembly will make the rising waters buoyant and the desired eddy velocity should be quickly established.

SUMMARY OF THE INVENTION

An improved air lift pump using an adjustably positioned 'Air Jet Assembly' in a duct, causes cold depth water to become buoyant and to become the oceans' surface water.

We are surfacing subsurface water at 40° F. from a depth of 700 or more feet. The use of air bubbles is a very efficient means of transporting water to the surface. The discharge ratio of water pumped to air supplied is rather large—about 800 to 1. The flow pattern consists of a vertical jet rising from the air jet assembly and a thin horizontal jet along the free surface of the water.

The ratio of water discharge to air discharge increases with depth and decreases with increased air discharge. The size of the bubbles is determined by the distance of the air jet assembly to the surface. As the bubbles rise, the pressure lessens and the bubbles increase greatly in size—this acts to increase the air volume and the air jet assembly loses its ability to raise water.

The air jet assembly has multiple air outlets—enough to furnish the water with sufficient buoyancy to have the proper eddy velocity. We raise or lower the air jet assembly until the bubbles' size reach their greatest lifting power. Because of the lessened weight of the total water in the duct—due to the buoyant water above the air jet assembly—cold subsurface water is pushed into the duct through the lower entrance—the buoyant, cold, deep water becomes the oceans' surface water. When the air jet assembly is in its proper position, it is fixed. Much less pressure is needed than at the depth of the deep subsurface water. By raising or lowering the air jet assembly, we increase or lower the weight difference between the 'in' and 'out' duct waters and increase or lower the eddy velocity.

The temperature difference between uplifted cold subsurface water now on the water's surface and the surrounding warm water and warm land, causes a wind of the desired speed to drive the propellers of wind turbines—or is used to power a heat engine—for an efficient production of electricity.

DESCRIPTION OF THE DRAWINGS

FIG. 1 is a view of two representative air-lift pumps illustrating the inventive method of upwelling cold subsurface water returning the same to the sea's depth;

FIG. 2 shows an arrangment of a plurality of air-lift pumps over a square portion of the surface of the sea;

DESCRIPTION OF THE PREFERRED EMBODIMENT

Figures 3, 4:
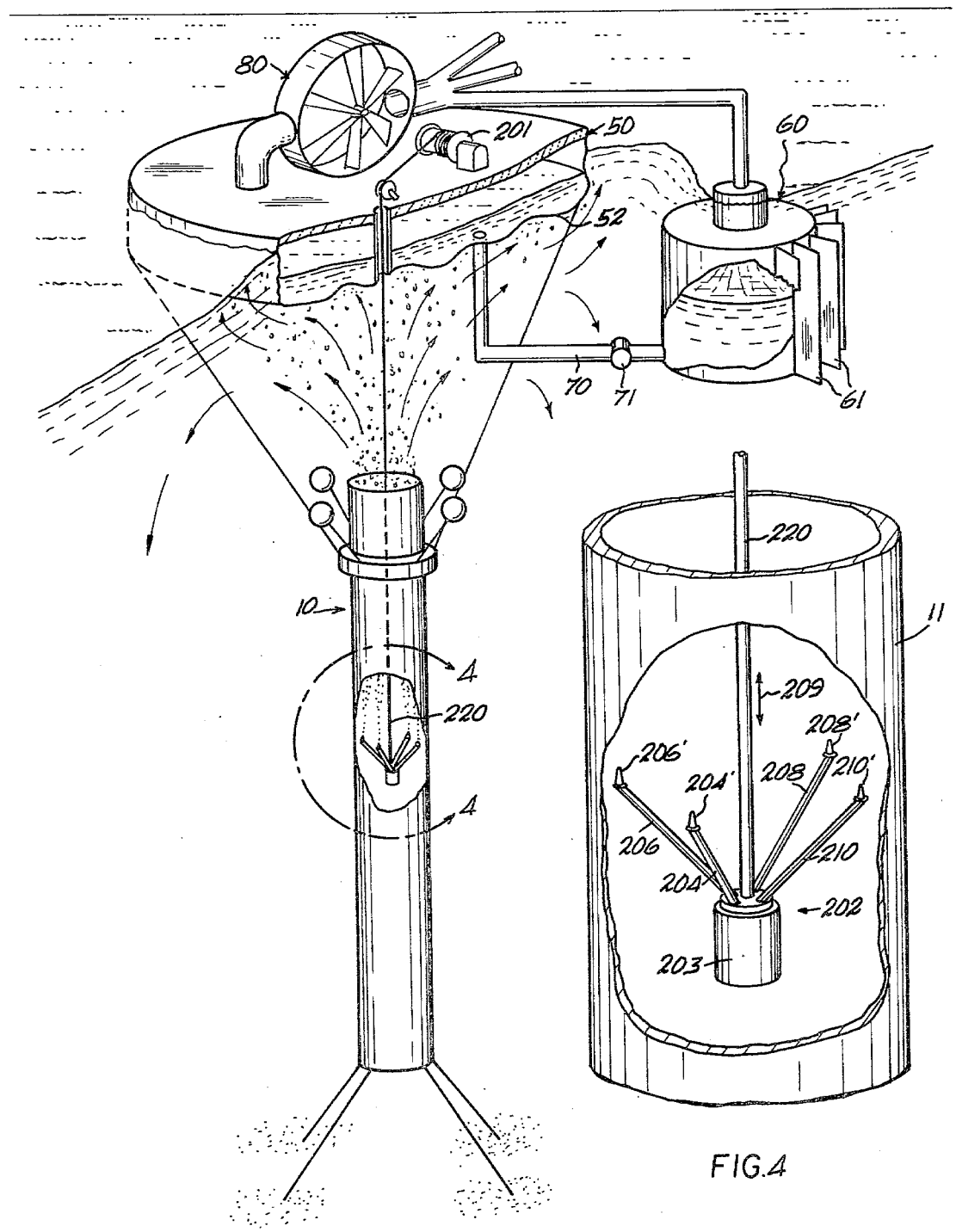
FIG. 3 is a view, partly broken away of the apparatus and method of converting sea's thermal power into electricity utilizing a heat engine.
FIG. 4 is an enlarged view of a portion of FIG. 3 as designated by the arrowed line 4—4 therearound.

As shown in FIG. 1, there are two air-lift water pumps. Each of these pumps 10 comprises a conduit 11, floatation means 20 for maintaining conduit 11 in a substantially vertical position and anchor means 30 for anchoring each conduit 11 to the floor of the body of water within which it is positioned. The body of water may be an ocean or sea. As seen in FIG. 1, and best seen in FIG. 4, an Air Jet Assembly, genereally designated by the numeral 202, is adjustable vertically in the direction of the arrowed line 209 in FIG. 4, within the conduit 11.

In FIG. 2 an array of water pumps 10 is shown in a square area representative of the surface of the ocean having ¼ mile long sides. A total of nine water pumps such as that designated by the numeral 10 are shown therein, each water pump is spaced approximately 440 feet from each other. Each pump 10 in the outer row of the array is spaced 220 feet from the imaginery edge of the one-quarter square mile area. In this matter, any number of such arrays may be joined and each water pump 10 will be spaced about 440 feet from an adjacent water pump. It is envisioned that a single air compressor, or if desired, a plurality of air compressors, the latter not being shown, will be utilized to supply compressed air to each of the nine water pumps 10 within the quarter mile area. The air is supplied to each water pump through a conduit 220, see FIG. 4 to the Air Jet Assembly 202. The method of ducting the compressed air to the Air Jet Assembly is optional and may be accomplished by any number of ways presently known. For example, rubber or plastic supply lines may extend from a floating air compressor or a plurality of air compressors to the air jet assembly adjustable vertically in each of the water pumps 10. Alternatively, the lines or hoses may extend through the top 13 of the water pumps 10 and channeled to the Air Jet Assembly 202 at a suitable depth. The important point is that the compressed air is released inside the conduits 11 from the Air Jet Assembly which is preferably adjustable vertically. The hose 220 and the attached Air Jet Assembly 202 may be raised or lowered by manipulating a reel 201 for up and down movement.

The pressure of the compressed air is greater than the pressure existing at the level at which it is released through the Air Jet Assembly. For example, assuming the depth at which the water temperature is a constant 40° F. is 1,000 feet below the surface of the ocean, then the delivery pressure from the Air Jet Assembly into the conduit 11 should be in the order of 550 psi.

Figure 5:
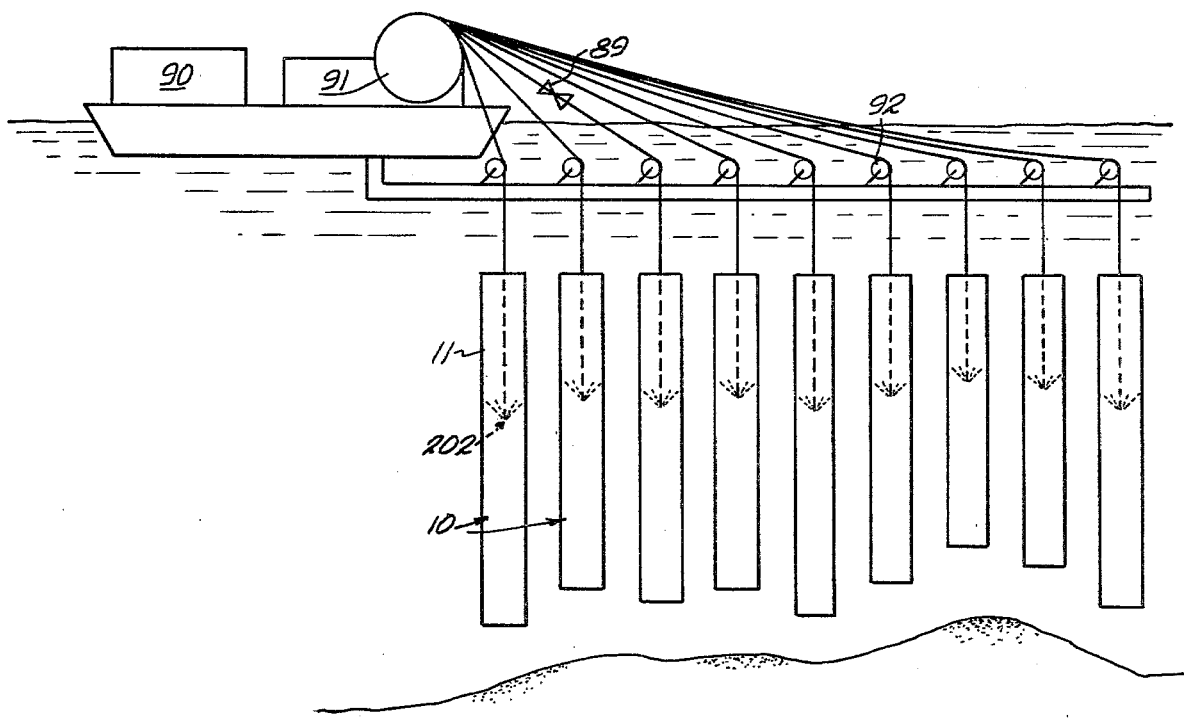
FIG. 5 illustrates the inventive method in one embodiment for producing electricity by utilizing the instant invention.

As shown in FIG. 1, the bottom ends 12 of conduits 11 will be located at different ocean depth because of the irregular shape of the ocean's bottom. Therefore, as shown in FIG. 5, since one compressor 90 supplies to nine water pumps 10 the different depths of the Air Jet Assembly of the conduits 11 is to be considered. Air pressure is supplied at greater pressure than that of the water at the Air Jet Assembly level with the extra pressure being preferably 0.4 of a horse-power. It is desirable to avoid discrepencies in the amount of air delivered to each water pump notwithstanding the difference in their respective length. This may be accomplished as shown in FIG. 5 by having a single compressor 90 and a compressed air storage tank 91 for nine pumps. The tank is then maintained at a constant pressure of approximately 550 psi in the example used. A pressure regulating valve, such as 89, may also be supplied for each line to each conduit 11. In this manner, one compressor may be used to supply compressed air to each of the nine air pumps 10 and no single water pump 10 will suffer from a lack of compressed air regardless of its depth relative to any other water pump 10. Should one array of nine water pumps 10 have their respective air jet asemblies at a substantially different depth from one another then the pressure of the compressed air supplied to it may be varied appropriately.

In the embodiment seen in FIG. 5, a take-up reel 91 may be provided with guide reels 92 being incorporated into the valve means 89 as indicated.

The device is shown in FIG. 1 and designated by the numeral 10; the bottom ends 12 of conduits or pump structures 11 will be located at a different ocean depth because of the irregular shape of the ocean's bottom. Therefore, as shown in FIG. 5, one compressor 90 supplies air to nine pumps. The tank is then maintained at a constant pressure. Pressure regulating valves such as 89 are preferably supplied at the exit of the storage tank for each line to each conduit 11. In this manner, one compressor may be used to supply compressed air to each of the nine air pumps 10 and no one water pump 10 will suffer from a lack of compressed air regardless of its depth relative to any water pump 10.

Now we turn the kenetic energy buried in the oceans' temperature differences directly into electricity, we should take advantage of the tropical surface waters whose surface temperature is always 85°. The area of Micronesia is the largest sea thermal resource in the world, five million square miles.

Figure 6:
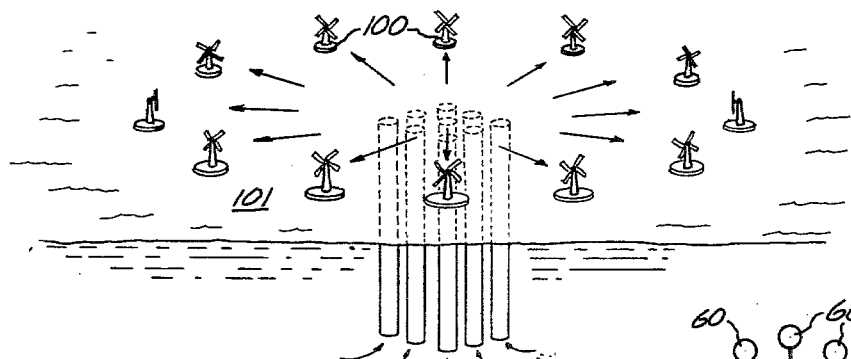
FIG. 6 illustrates the inventive method of producing electricity by aero-turbines positioned on floats.

In FIG. 2, one-quarter square mile area is represented. It contains nine nozzles, all 440 feet apart. Heat Engines, see FIG. 3, can be used instead of Wind-Turbines 100, see FIG. 6, at least one Wind-Turbine may be used for the electricity it produces and to act as a self starter for the Heat Engine. The Condensors of these nine Heat Engines receive 450,000 cubic feet per minute of 40° Coolant—50,000 cubic feet per minute of Coolant for each heat engine.

Our nozzles are situated above subsurface waters of 40°. The differences between the 85° surface temperature and the 40° in the Heat Engines Compressor can cause our Heat Engines to develop millions of kw.

If more Coolant is needed we can multiply the nozzles for each Condensor and/or increase the size of the Condensor.

The warmer surface water is all around the Boiler. The water is cooled by tranferring some of the heat of the Boiler. The cooled water sinks. This heavier cooled water is washed out below the thermocline and does not enter into the warmer surface water, leaving the entire surface ready to be used.

We can use the entire warmer surface waters without lowering its temperature. Water will be pulled in laterally for miles around without drawing on the lower thermal level.

Referring to the Air Jet Assembly 202 in FIG. 4, it includes a weight portion 203 for stability and to keep the discharge ports 204', 206', 208' and 210' at a horizontal coplanar relation generally, each being fed from the respective supply pipes 204, 206, 208 and 210 which are in turn are fed by the hose 220.

Figure 7:
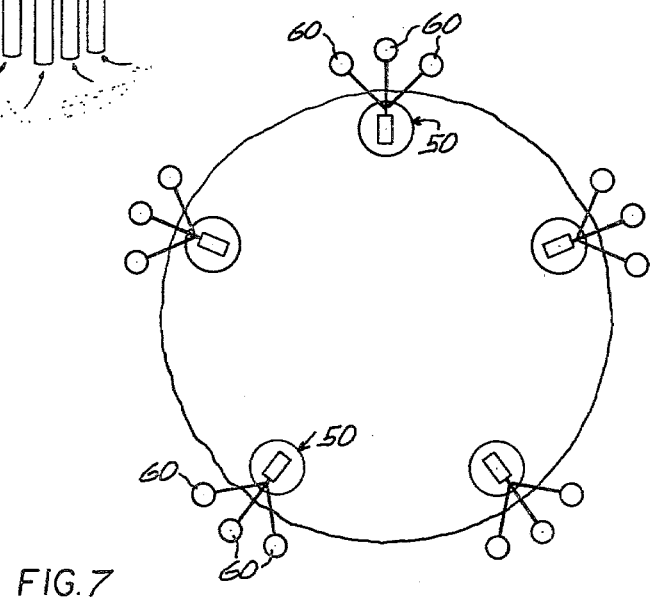
FIG. 7 illustrates a series of heat engines surrounding one of a plurality of areas of cold water.

Referring to the heat engine in FIG. 3, the boiler is generally indicated by the numeral 60. It includes a condenser 50 having the turbine 80 mounted upon it and the reel 201 for raising and lowering the hose 220 which carries the air jet assembly and with conduit means 70 which may have the valve means 71 to circulate the boiled and condensed material to the unit designated by the numeral 60 which may have fins as at 61 and which operates as a conventional heat engine. In the embodiment shown in FIG. 7, these heat engines, each composed of a heat engine 60 and an associated condenser 50 and conduit 70, may be arranged in a pattern. Alternatively, since the winds will be caused to blow, aerogenerators may be floated in a pattern and anchored suitably into the position shown.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed:

1. An improved method of producing useful energy from the thermal power of a large body of water, having a depth of at least 700 feet and having cold subsurface water and warmer surface water comprising the steps of:

upwelling said cold subsurface water creating an area of cold subsurface water on the surface of said body of water said area being surrounded by the warmer surface water; and, positioning a substantially vertical duct within said body of water, said duct having an open lower end located within said cold subsurface water and an open upper end positioned within said warmer surface water; and, releaing a multitude of compressed air bubbles through an air jet assembly positioned within the upper portion of said duct to create a buoyant mixture of air bubbles and water above said release point, said buoyant mixture causing a lessened weight of the total water within the duct thereby forcing cold subsurface water into the open bottom end of the duct, rising up within the duct, being mixed with the released air bubbles and finally surfacing at and becoming the surface of said body of water; and, adjusting the depth of said air jet asembly within said upper portion of said duct until the bubbles' size achieve their greatest lifting power and to adjust the weight difference between the water within the duct and an equivalent volume of water outside the duct thereby adjusting the eddy velocity of the water within the duct; and, utilizing the temperature differential between said area having cold subsurface water thereon and said surrounding warmer surface water to generate electricity.

2. The method of claim 1, including the step of generating electricity by a heat engine the condensor of which is positioned in the area having cold subsurface water thereon at a location above the outlet of said duct, the boilers of which are positioned within said surrounding warmer water, with the output of said boiler being operatively connected to a turbine-generator which is operatively connected to said condensor.

3. The method of claim 1, including the steps of:
generating electricity by one or more aero turbines which are positioned within said substantially warmer water surrounding said area having cold subsurface water thereon, said aero turbines being driven by winds created by the phenomena of thermal convection which causes the heavier colder air over said area having cold subsurface water thereon to blow in a horizontal direction toward the lighter hotter air over the warm water surrounding said area having cold subsurface water thereon.

4. The method of claim 1, including the steps of:
positioning said area having cold subsurface water thereon adjacent to a land mass having air temperatures substantially lower than the air temperature above said area having cold subsurface water thereon and on which land mass a plurality of aero turbines are positioned said aero turbines being driven by onshore winds created by the phenomena of thermal convection.

5. The method of claim 2, including the steps of:
combining a plurality of areas having cold water thereon and a vertical conduit having a heat engine associated therewith within a large area of said large body of water so as to produce a large amount of electricity.

6. Improved apparatus for producing useful energy from the thermal power of a large body of water having a depth of at least 700 feet and having cold subsurface water and warmer surface water comprising:
air lift pump means for upwelling said cold subsurface water creating an area of cold subsurface water on the surface of said body of water, said area being surrounded by the warmer surface water; and,
said air lift pump means comprising a duct positioned substantially vertically within said body of water, said duct having an open lower end located within said cold subsurface water and an open upper end located within said warmer surface water, and a source of compressed air, including an adjustable pressure regulating valve, air jet means within the upper portion of said duct for releasing a large number of compressed air bubbles within said duct to create a buoyant mixture of air and water above said air jet means, an air line operatively connected between said air jet means and said compressed air source; and,
means for adjusting the depth location of said air jet means below the surface of said body of water whereby the size of the air bubbles within said duct achieve their greatest lifting power and for adjusting the eddy velocity of the water within the duct; and,
means for utilizing said area having cold subsurface water thereon and the surrounding warmer water of said body of water to generate electricity.

7. The apparatus of claim 6, wherein said electricity generating means comprises one or more aero turbines which are positioned within said surrounding warmer water, said aero turbines being driven by winds from the cold subsurface area to the surrounding warmer area by thermal convection.

8. The apparatus of claim 6, wherein said electricity generating means comprises one or more aero turbines which are positioned on a land mass having a warmer air temperature than said temperature of the area having cold subsurface water thereon, said aero turbines being driven by onshore winds created by thermal convection.

9. The apparatus of claim 6, wherein said electricity generating means comprises a heat engine the condensor is positioned in the area having cold subsurface water thereon at a location above the outlet of said vertical duct, the boilers of which are positioned within said surrounding warmer water, the output of said boilers being operatively connected to a turbine generator which is operatively connected to said condensor.

10. The improved apparatus of claim 1, whereby said adjustable depth location means comprises a line secured at one end to said air jet means and to take-up means at its other end, said take-up means being located at said surface of said body of water, for raising and lowering the said air jet means within said duct to said optimal position below the surface of said body of water.

* * * * *